UNITED STATES PATENT OFFICE.

ALEXANDER BERNSTEIN, OF BERLIN, GERMANY.

FOOD COMPOUND AND METHOD OF PREPARING SAME.

SPECIFICATION forming part of Letters Patent No. 560,834, dated May 26, 1896.

Application filed January 6, 1896. Serial No. 574,528. (No specimens.)

*To all whom it may concern:*

Be it known that I, ALEXANDER BERNSTEIN, a subject of the Emperor of Germany, residing at Berlin, Germany, have invented new and useful Improvements in Utilizing the By-Products of Dairies; and I do hereby declare that the following is a full, clear, and exact description of the invention, which will enable others skilled in the art to which it appertains to make and use the same.

The object of my invention is to utilize the by-products of dairies—viz., the separated or skim milk, the butter-milk, and the whey—for the manufacture of a beverage which has the property of being perfectly transparent and which can be sterilized by heat without altering its qualities, with the exception of producing a darker color by continued heating, and which will not alter its taste in course of time.

In order to make a clear beverage, it is necessary that all the protein matter in the milk which is undissolved or which coagulates by heating should be completely removed from the milk. In order to prevent any alteration in taste, it is further necessary that every trace of fat should be removed, as the fat is subject of slow oxidation, thereby producing acids, which in course of time would impart a rancid flavor to the beverage. The protein matter in milk is of four kinds—viz., the casein, the albumen, the albumose, and the lactoprotein. The casein is undissolved in the milk, the albumen is dissolved, but is coagulated by heat, the albumose and the lactoprotein are dissolved and not affected by heating in sterilizing. The fat is distributed in the form of small globules, which cannot be entirely removed by the ordinary process of skimming.

I shall describe the process of carrying out my invention by supposing separated milk to be used, the treatment being the same in principle if the other by-products are employed.

A certain quantity of the separated milk— say ten gallons—is poured into a vessel and heated to about 35° centigrade, and then rennet, such as is used for cheese-making, is added, and the milk allowed to stand for about two hours in a slightly-warm place. The curd being then sufficiently contracted, the whey is poured off and the curd is gently pressed between pieces of cloth in order to remove the whey which is still inclosed in it. The curd may be used for cheese-making, and the whey, which is further treated according to my invention, is left standing for about twenty-four hours at a temperature of 15° centigrade, so as to become distinctly sour. The right amount of acidity is a matter of great importance. It should be such that twenty-five cubic centimeters of the whey require twelve cubic centimeters of the one-tenth solution of sodium hydrate in order to show neutral reaction, and this acidity should be ascertained by the well-known method of titration, using phenolphtalein as an indicator.

For the purpose of insuring the production of the desired degree of acidity a pure culture of lactic-acid bacteria, such as is no wfrequently used for souring the cream in buttermaking, may be added to the whey. As, however, it is only essential that a certain amount of acid should be contained in the whey, ready-made acids, such as lactic or citric acid, may be added. The next operation consists in heating the acidulated whey in steam-chambers for about two hours. This has the effect, by the combined action of acid and heat, of precipitating the remaining parts of the casein which have not been acted on by rennet and of coagulating the albumen. The liquid must now be cooled and should be brought down to a temperature of from 5° to 10° centigrade, so as to solidify the globules of fat still contained in it. Filtration is next resorted to, and it is well to use a deep funnel, into which a thick filtering-cloth is placed. When the liquid is poured in, the precipitated protein matter will soon collect at the bottom of the funnel and act as a filtering medium, preventing the solidified globules of fat from passing through, so that the filtrate will be clear and transparent and free from fat.

The filtrate contains only the protein matter in the form of albumose and lactoprotein, the milk, and a slight amount of acid sugar, and the salts of the milk. It has the transparency of wine and an agreeable taste. The taste may be improved by the addition of flavoring substances—say, for instance, hops—and the beverage may be made subject to alcoholic fermentation.

Having now particularly described and ascertained the nature of my said invention and in what manner the same is to be performed, I declare that what I claim is—

1. The herein-described process of preparing a beverage from by-products of dairies, which consists in producing whey from said products, acidulating and heating the acidulated whey, cooling the fluid to solidify the fatty globules, and thereafter removing the fat with the precipitated protein matter by filtration, substantially as described.

2. As an article of manufacture, a clear and transparent milk beverage containing the albumoses which do not coagulate by heat, milk-sugar and the salts of milk and which is entirely free from casein, albumen and the fatty matters of the milk, substantially as described.

ALEXANDER BERNSTEIN.

Witnesses:
JOHN E. BOUSFIELD,
E. CHURCHER.